US012792022B2

(12) United States Patent
Albrecht et al.

(10) Patent No.: US 12,792,022 B2
(45) Date of Patent: Nov. 10, 2026

(54) AUTOMATION DEVICE, METHOD AND SYSTEM FOR TRANSMITTING DATA WITHIN AN INDUSTRIAL AUTOMATION SYSTEM

(71) Applicant: Siemens Aktiengesellschaft, Munich (DE)

(72) Inventors: Harald Albrecht, Nuremberg (DE); Stephan Höme, Schwabach (DE); Thomas Fischer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 18/746,285

(22) Filed: Jun. 18, 2024

(65) Prior Publication Data

US 2024/0427316 A1 Dec. 26, 2024

(30) Foreign Application Priority Data

Jun. 20, 2023 (EP) .................................... 23180287

(51) Int. Cl.
*G05B 19/418* (2006.01)
*H04L 67/00* (2022.01)
(Continued)

(52) U.S. Cl.
CPC .................... *G05B 19/4185* (2013.01); *G05B 2219/31368* (2013.01)

(58) Field of Classification Search
CPC .............. G05B 19/4185; G05B 19/418; G05B 2219/31368; G05B 2219/25257;
(Continued)

(56) References Cited

U.S. PATENT DOCUMENTS

2009/0109889 A1* 4/2009 Budampati ......... H04L 12/1895 370/312
2022/0294878 A1* 9/2022 Knab ...................... H04L 45/04
(Continued)

FOREIGN PATENT DOCUMENTS

CA 2572060 A1 * 1/2006 ............. H04L 45/00
DE 10138363 2/2003
(Continued)

OTHER PUBLICATIONS

Bjorn Topel et al., "AF_XSD," printed 2026 (Year: 2026).*
(Continued)

*Primary Examiner* — Alina A Boutah
(74) *Attorney, Agent, or Firm* — Cozen O'Connor

(57) ABSTRACT

Automation device, method and system for transmitting data within an industrial automation system, wherein at least one first automation device makes available payload data comprising control, measurement and/or status data for reception by control applications executing in second automation devices, where the first automation device sends datagrams comprising the payload data or a selection of payload data to at least one multicast group, the second automation devices register themselves selectively as subscribers at least in a multicast group and each have at least one network adapter that forwards received datagrams associated with the multicast groups, via a socket assigned to a network protocol stack functional unit of an operating system of the respective second automation device, to a filter unit of the respective second automation device.

16 Claims, 2 Drawing Sheets

(51) Int. Cl.

| | |
|---|---|
| ***H04L 67/55*** | (2022.01) |
| ***H04L 69/16*** | (2022.01) |
| ***H04L 69/321*** | (2022.01) |

(58) Field of Classification Search

CPC ......... H04L 67/34; H04L 67/55; H04L 67/12; H04L 67/1097; H04L 67/568; H04L 69/321; H04L 69/162; H04L 47/15; H04L 47/2441; H04L 47/52; H04L 47/70; H04L 47/28; H04L 47/727; H04L 47/806; H04L 41/0896; H04L 43/08; H04L 45/74; G06F 9/455

See application file for complete search history.

(56) References Cited

U.S. PATENT DOCUMENTS

| | | | | |
|---|---|---|---|---|
| 2022/0353342 | A1* | 11/2022 | Kerschbaum | H04L 67/12 |
| 2023/0269309 | A1* | 8/2023 | Blair | H04L 69/164<br>370/464 |

FOREIGN PATENT DOCUMENTS

| | | | | | |
|---|---|---|---|---|---|
| EP | 3054385 | A1 * | 8/2016 | | H04L 49/30 |
| EP | 3576376 | | 12/2019 | | |
| EP | 3576376 | A1 * | 12/2019 | | H04L 12/1859 |
| EP | 3702856 | A1 * | 9/2020 | | H04L 67/56 |
| EP | 3702857 | A1 * | 9/2020 | | H04L 67/5682 |
| EP | 3702920 | A1 * | 9/2020 | | H04L 67/562 |
| EP | 3703342 | A1 * | 9/2020 | | H04L 67/1051 |
| EP | 3716528 | A1 * | 9/2020 | | H04L 69/162 |
| EP | 4231562 | A1 * | 8/2023 | | H04L 1/1887 |
| WO | WO-2019034329 | A1 * | 2/2019 | | G06F 16/9027 |
| WO | WO-2020130170 | A1 * | 6/2020 | | G05B 23/0243 |
| WO | WO-2021093928 | A1 * | 5/2021 | | H04L 67/55 |

OTHER PUBLICATIONS

Daniel Lavie, “A Gentle Introduction to XDP,” Datadog, published May 12, 2023 (Year: 2023).*

Pfrommer, Julius et al. “Open Source OPC UA PubSub Over TSN for Realtime Industrial Communication”; 2018 IEEE 23rd International Conference on Emerging Technologies and Factory automation; Bd. 1; p. 1087-1090; Sep. 4, 2018.

Drahos, Peter et al. “Trends in industrial communication and OPC UA”; 2018 Cybernetics & Informatics; pp. 1-5; Jan. 31, 2018.

* cited by examiner

AUTOMATION DEVICE, METHOD AND SYSTEM FOR TRANSMITTING DATA WITHIN AN INDUSTRIAL AUTOMATION SYSTEM

BACKGROUND OF THE INVENTION

1. Field of the Invention

The present invention relates to system, a method for transmitting data within an industrial automation system and to an automation device for receiving payload data comprising control, measurement and/or status data.

2. Description of the Related Art

Industrial automation systems are used to monitor, control and regulate technical processes, in particular in the field of manufacturing, process and building automation, and make it possible to operate control devices, sensors, machines and industrial installations in a manner which is intended to be as independent as possible and independent of human interventions. On account of a constantly increasing importance of information technology for automation systems comprising numerous networked control or computer units, methods for reliably providing functions distributed across an automation system for providing monitoring, control and regulation functions are becoming increasingly important. A particular problem regularly results in industrial automation systems from message traffic with a comparatively large number of, but relatively short, messages, thus intensifying the above problems.

MQTT (MQ Telemetry Transport or Message Queue Telemetry Transport) is a machine-to-machine communication (M2M) message protocol that is intended for the transmission of messages containing telemetry data between a publisher communication device and a subscriber communication device. An MQTT broker in this case maintains a central database for information about all publishers and subscribers of telemetry data. The MQTT broker is used by publishers or subscribers to receive commands or collect data.

OPC Unified Architecture (OPC UA) defines a M2M communication protocol in accordance with International Electrotechnical Commission (IEC) standard 62541 and makes it possible to describe for example machine parameters, control variables or measured values semantically, so that such machine data can be evaluated automatically. OPC UA particularly comprises an object-oriented namespace concept including metadata for object description. OPC UA servers provide an instance and type system within which clients can navigate and retrieve information. In addition, OPC UA defines multiple discovery mechanisms for announcing compatible automation devices and their functions and properties.

DE 10 138 363 A1 discloses a method for ensuring the quality of service of Internet applications, in which Internet applications are automatically adapted and optimized using those resources of the IP access network and the end system that are available at the time of launch of the Internet application. Internet applications capture the IP access network quality of service (QOS) communication requirements and store them as application profiles. When an Internet application is activated, the currently available network resources of the IP access network are compared with the stored application profiles and control data are determined. The provision of the network resources for the Internet application in question is optimized based on the determined control data. The optimization in this case refers to an adapted time sequence and the determination of the most favorable constellation from a cost point of view (transmission costs).

It is known from EP 3 576 376 A1 that at least one first automation device within an industrial automation system makes available payload data comprising control, measurement and/or status data for retrieval or reception by multiple second automation devices. The first automation device cyclically sends first information to advertise available payload data to a predefined first multicast address within the industrial automation system. The first information in each case comprises details about the first automation device, a second multicast address, via which details about available payload data are made available, and second information regarding the addressing of payload data, using which the first automation device makes available payload data. The second automation devices receive details, sent to the second multicast address, about available payload data. In addition, the second automation devices receive payload data selected based on the read second information.

In addition to the widely used OPC UA Client/Server M2M communication protocol, OPC UA Publish-Subscribe (PubSub) (OPC UA, Part 14) implements a publisher-subscriber model that is used for a data exchange between service providers (publishers) and any number of service users (subscribers). Here, publishers make their data available completely independently, and in particular without any prior subscriber-side request. Subscribers receive data only from those publishers for which they have been configured, such as during commissioning of an installation. Messages from publishers particularly comprise a number of data fields via which subscribers can filter out messages that are relevant to them. These data fields are usually assigned to OSI Layer 5 or higher. However, common network adapters can filter messages from publishers based only on MAC or IP address and possibly UDP port. On the subscriber side, effective pre-filtering of publisher messages directed, for example, to a common subscriber broadcast address, in order to avoid unnecessary load on subscriber systems, is possible only with special, more comprehensively programmable network adapters. However, such network adapters are complex and expensive.

SUMMARY OF THE INVENTION

It is an object of the present invention to provide devices and a method for transmitting data within an industrial automation system, where the method enables efficient processing of a multiplicity of payload data provided by service providers when network adapters that do not support message filtering or data field filtering on higher protocol layers are used on the service user side.

This and other objects and advantages are achieved in accordance with the invention by a system, an automation device and method for transmitting data within an industrial automation system, where at least one first automation device within the industrial automation system makes available payload data comprising control, measurement and/or status data for reception by control applications running in second automation devices. The first automation device sends datagrams comprising the payload data or a selection of payload data to one or more multicast groups. The second automation devices register themselves selectively as subscribers at least in a multicast group. Preferably, the first automation device makes the payload data available for the second automation devices in accordance with OPC UA PubSub. In this case, the first automation device serves as publisher, while the second automation devices serve as subscribers.

The second automation devices each have at least one network adapter that forwards received datagrams associated with the multicast groups, in accordance with the invention, via a socket assigned to a network protocol stack functional unit of an operating system of the respective second automation device, to a filter unit of the respective second automation device. The network adapters of the second automation devices each comprise in particular a PHY component and a MAC component. The sockets are preferably Express Data Path sockets (XDP sockets).

In addition, a request to provide the sockets is advantageously made by the control applications via an application programming interface of the filter unit. Accordingly, the sockets may be provided to the control applications via this application programming interface. Sockets are thereby can be requested quickly and securely and provided to requesting processes.

The filter unit, in accordance with the invention, discards the forwarded datagrams or forwards them to the respective control application based on forwarding criteria respectively predefined by the control applications. Here, the datagrams are forwarded directly to the control applications or the datagrams are discarded directly via the sockets, without processing by the operating system of the respective second automation device.

In particular, the present invention makes it possible to use widely available and inexpensive network cards that have only limited filter resources at the hardware level. This is achieved via subscriber-side filter units that are close to the network adapters and are connected to the network adapters via sockets. Such pre-filtering of received datagrams thus does not lead to subscriber-side load on network stacks in host operating systems.

In accordance with one advantageous embodiment of the present invention, the first automation device cyclically sends first information to advertise available payload data to a predefined first multicast address within the industrial automation system. Here, the first information comprises details about the first automation device and at least one second multicast address via which selected payload data are made available. The second automation devices can are thus filter the first information based on respectively selected details and can read the respective second multicast address from selected first information. Preferably, the second automation devices register themselves as subscribers in the multicast group associated with the respectively read second multicast address. The second automation devices can thereby receive selected payload data sent to the respective second multicast address.

Preferably, the control applications are each provided via at least one sequence control component that is loadable into a sequence control environment installed on the respective second automation device and executed there. The sequence control components run/execute in isolation from one another within the sequence control environment and share an operating system core of the respective second automation device. In particular, the sequence control components may be containers, such as Docker containers, WebAssembly or Java bytecode, while the sequence control environment is, for example, a container runtime environment, such as Docker Engine, a WebAssembly runtime environment or a Java virtual machine. The sequence control environment is preferably used to create, delete or link virtual resources. In addition to containers, the virtual resources in this case also comprise for example virtual communication networks and connections assigned thereto.

Moreover, the sequence control components may also comprise container groups, such as pods. In principle, alternative micro-virtualization concepts, such as snaps, or orchestrated container runtime environments, such as podman or Kubernetes, may also be used for the sequence control components. Stored images for containers may be retrieved for example from a storage and provision system able to be accessed in read and/or write mode by a multiplicity of users.

In order to forward multicast datagrams containing selected payload data from the first automation device to the second automation devices via network infrastructure devices, quality of service parameters characterizing quality of service requirements are preferably specified by the first automation device or the second automation devices. In the network infrastructure devices, resources for transmitting the multicast datagrams in accordance with the specified quality of service parameters are reserved, in each case provided there is sufficient availability. The availability is checked in this case by a superordinate communication control unit of the automation system or the network infrastructure devices. The network infrastructure devices may in particular be switches or bridges. The resources for transmitting the multicast datagrams in this case comprise, for example, usable transmission windows, bandwidth, maximum guaranteed latency, queue count, queue cache or address cache in switches or bridges.

In accordance with one particularly preferred embodiment of the present invention, forwarding of the multicast datagrams via the network infrastructure devices is controlled via frame preemption, in particular in accordance with Institute of Electrical and Electronics Engineers (IEEE) standard 802.1Q, via time-aware shapers, in particular in accordance with IEEE standard 802.1Q, via credit-based shapers, in particular in accordance with IEEE standard 802.1Q, via burst-limiting shapers, via peristaltic shapers and/or via priority-based shapers. This makes it possible to ensure deterministic communication behavior on the basis of standardized, inexpensive components.

The system in accordance with the invention is intended to perform the method in accordance with the disclosed embodiments and comprises at least one first automation device and multiple second automation devices within an industrial automation system. The first automation device is configured to make available payload data comprising control, measurement and/or status data within the industrial automation system for reception by control applications running in second automation devices. The first automation device is furthermore configured to send datagrams comprising the payload data or a selection of payload data to one or more multicast groups.

The second automation devices are each configured, in accordance with the invention, to register themselves selectively as subscribers at least in a multicast group. The second automation devices furthermore each have at least one network adapter that is configured to forward received datagrams associated with the multicast groups, via a socket that is assigned to a network protocol stack functional unit of an operating system of the respective second automation device, to a filter unit of the respective second automation device.

The filter units are each configured to discard the forwarded datagrams or to forward them to the respective control application based on forwarding criteria respectively predefined by the control applications. Here, the datagrams are forwarded directly to the control applications or the datagrams are discarded directly via the sockets, without processing by the operating system of the respective second automation device.

The automation device in accordance with the invention is suitable for the system in accordance with the disclosed embodiments and is configured to register itself selectively as a subscriber at least in a multicast group. The automation device furthermore has at least one network adapter that is configured to forward received datagrams associated with multicast groups, via a socket assigned to a network protocol stack functional unit of an operating system of the automation device, to a filter unit of the automation device. The filter unit is configured to discard the forwarded datagrams or to forward them to the respective control application based on forwarding criteria respectively predefined by control applications.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawing, in which.

DETAILED DESCRIPTION OF THE EXEMPLARY EMBODIMENTS

Figure 1:
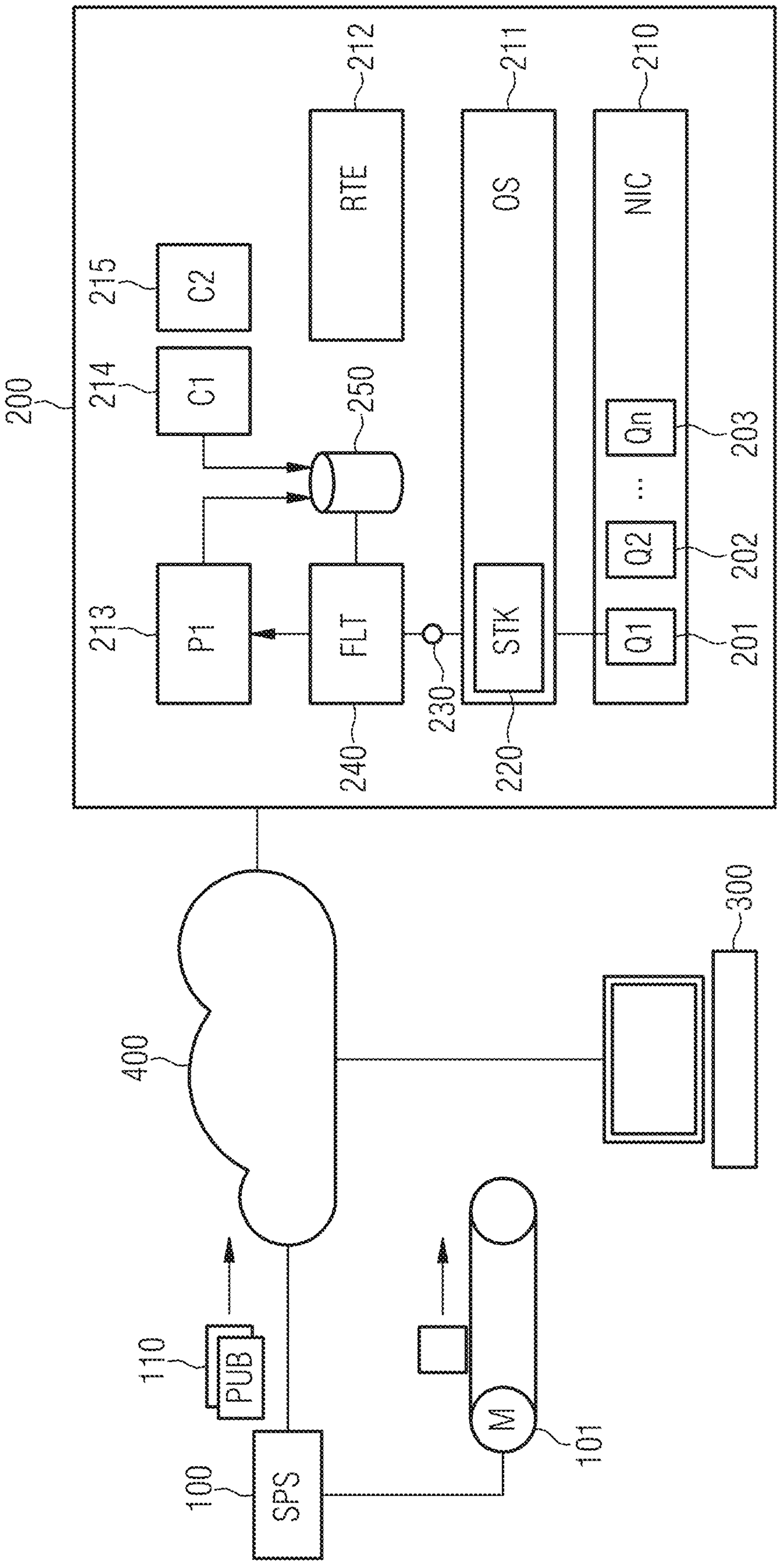
FIG. 1 is a schematic illustration of a system for transmitting data to one or more multicast groups within an industrial automation system in accordance with the invention.

The system illustrated in the FIG. 1 comprises a first automation device 100, such as a programmable logic controller for controlling a connected machine 101, the automation device making available payload data comprising control, measurement and/or status data for reception by control applications running in second automation devices 200, 300 via a communication network 400 of an industrial automation system. The communication network 400 advantageously comprises a multiplicity of data-forwarding communication devices, in particular switches, and thus provides connectivity for a multiplicity of first and second automation devices. In addition to programmable logic controllers or numerical machine controllers, the second automation devices may, for example, be hosts 200 with monitoring and control functions or operator control and monitoring stations 300.

The first automation device 100 sends datagrams 110 comprising the payload data or a selection of payload data to one or more multicast groups. The second automation devices 200, 300 register themselves selectively as subscribers at least in a multicast group. In the present exemplary embodiment, the first automation device 100 makes the payload data available for the second automation devices 200, 300 in accordance with OPC UA PubSub. Here, the first automation device 100 serves as publisher, while the second automation devices 200, 300 serve as subscribers. In principle, an automation device may be simultaneously assigned both a role as publisher and a role as subscriber, for example, if it provides automation services, on the one hand, and uses automation services from other devices, on the other hand.

Subscribers 200, 300 basically require metadata or details about available payload data from publishers 100. The metadata are advantageously announced regularly via a special UDP multicast group or UDP multicast address. Subscribers 200, 300 additionally require, in order to retrieve or receive payload data depending on the communication network protocol used, for example, a UDP multicast address assigned to the respective publisher 100 or, for Time Sensitive Networks (TSN), a stream identifier in accordance with IEEE 802.1Qat. Both UDP multicast addresses and TSN stream identifiers are usually allocated dynamically.

For example, in order to retrieve or receive payload provided by publishers 100, subscribers 200, 300 send a request to transmit an endpoint Uniform Resource Locator (URL) to a server of an OPC UA Global Discovery Service (GDS). For this purpose, the respective subscriber 200, 300 specifies in particular a PublisherID of the respective publisher 100. For example, the PublisherID may be configured in the subscriber 200, 300, in addition to a WriterGroupID assigned to the publisher 100.

Following transmission of the endpoint URL, the subscriber 200, 300 establishes a client-server connection to an OPC UA server of the publisher 100, for example, via an OPC UA client. The subscriber 200, 300 sends a request to transmit the UDP multicast addresses or stream identifier used by the publisher 100 over this client-server connection. In addition, the subscriber 200, 300 may also query a security group ID over the client-server connection.

As soon as the subscriber 200, 300 receives requested information regarding the addressing of payload data and metadata from the publisher 100 over the client-server connection, the subscriber 200, 300 can connect to the UDP multicast group, via an OPC UA subscriber component, to which the metadata describing the payload data are provided by an OPC UA publisher component of the publisher 100. In the event of additional security requirements, the subscriber 200, 300 may retrieve key material for decrypting the payload data from a security key service following successful authorization, citing the abovementioned security group ID. Finally, the subscriber 200, 300 receives the datagrams 110 containing the payload data from the publisher 100 via the UDP multicast address for payload data or via the stream identifier and decodes them based on the metadata.

Filtering of the datagrams 110 containing subscribed payload data by the second automation devices using the host 200 is explained by way of example. The following explanations apply to all other second automation devices accordingly. The host 200 has a network adapter 210, which forwards received datagrams 110 associated with the multicast groups, via RX/TX queues 201, 202, 203 of the network adapter 210 and via a socket 230 that is assigned to a network protocol stack functional unit 220 of an operating system 211 of the host 200, to a filter unit 240 of the host 200. The socket 230 is preferably an Express Data Path socket (XDP sockets). By way of example, a request to provide the socket 230 may be made by control applications 213-215 executing or installed on the host 200 via an application programming interface. After a socket 230 assigned to the filter unit 240 has been created, it is joined to an available RX/TX queue 201, 202, 203 of the network adapter 210.

While the control application 213 is implemented as a program running on an operating system 211 of the host 200, the control applications 214, 215 are implemented, in the present exemplary embodiment, via sequence control components that are loadable into a sequence control environment 212 installed on the operating system 211 of the host 200 as an application and executed there, or via containers. The sequence control components or containers execute in isolation from one another within the sequence control environment 212 and share an operating system core of the host 200. As an alternative to containers, the sequence control components may also be WebAssembly or Java bytecode. The sequence control environment 212 is accordingly a container runtime environment, a WebAssembly runtime environment or a Java virtual machine.

The filter unit 240 discards the forwarded datagrams 110 based on forwarding criteria respectively predefined by the control applications 213, 214, 215 and stored in a database 250 assigned to the filter unit 240, or forwards the datagrams 110 to the respective control application 213, 214, 215. Here, the datagrams 110 are forwarded directly to the control applications 213, 214, 215 or the datagrams 110 are discarded directly via the socket 230, without processing by the operating system 211 of the host device 200.

In accordance with one preferred embodiment, in order to forward multicast datagrams 110 containing selected payload data from the first automation device 100 to the second automation devices 200, 300 via network infrastructure devices contained within the communication network 400, quality of service parameters characterizing quality of service requirements are specified by the first automation device 100 or the second automation devices 200, 300. In the network infrastructure devices, resources for transmitting the multicast datagrams 110 in accordance with the specified quality of service parameters are reserved, in each case provided there is sufficient availability. The availability is checked, for example, by a superordinate communication control unit of the automation system or by the network infrastructure devices themselves.

The network infrastructure devices are in particular switches or bridges. The resources for transmitting the multicast datagrams 110 accordingly comprise usable transmission windows, bandwidth, maximum guaranteed latency, queue count, queue cache or address cache in switches or bridges. The forwarding of the multicast datagrams 110 via the network infrastructure devices is advantageously controlled by way of frame preemption, in particular in accordance with IEEE 802.1Q, via time-aware shapers, in particular in accordance with IEEE 802.1Q, via credit-based shapers, in particular in accordance with IEEE 802.1Q, via burst-limiting shapers, via peristaltic shapers or via priority-based shapers.

Figure 2:
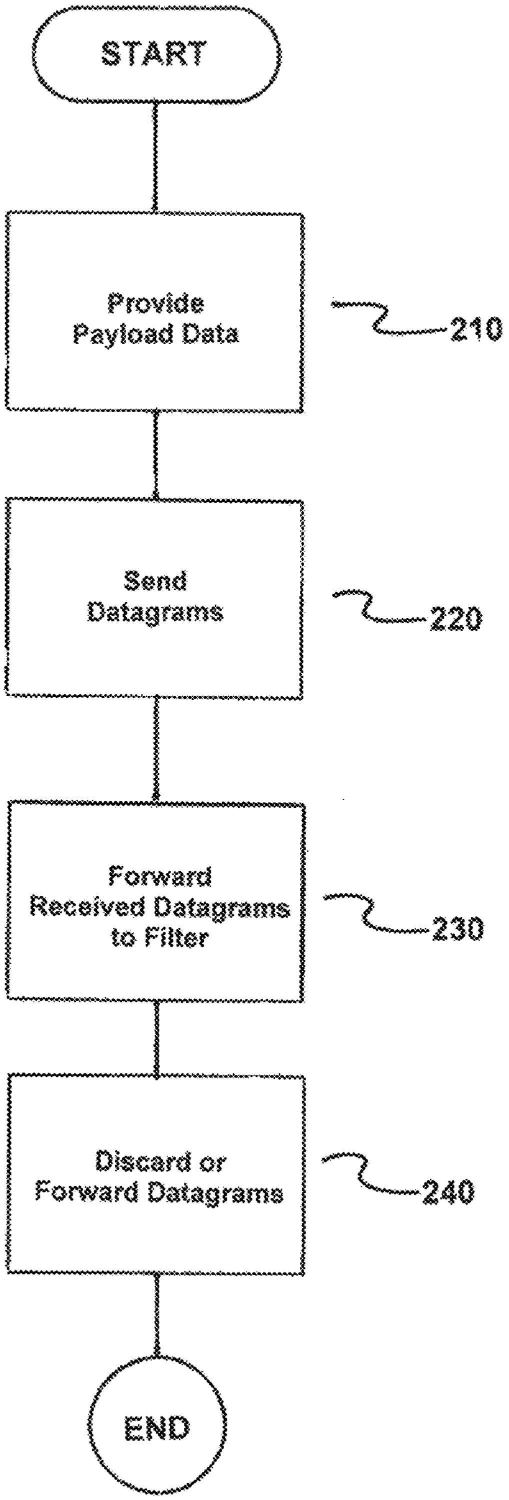
FIG. 2 is a flowchart of the method in accordance with the invention.

FIG. 2 is flowchart of the method for transmitting data within an industrial automation system. The method comprises making available, by at least one first automation device 100 within the industrial automation system, payload data comprising at least one of control, measurement and status data for reception by control applications 213, 214, 215 executing in second automation devices 200, 300, as indicated in step 210.

Next, the at least one first automation device sends datagrams 110 comprising the payload data or a selection of payload data to at least one multicast group, as indicated in step 220. Here, the second automation devices registering themselves selectively as subscribers at least in a multicast group.

Next, the at least one network adapter 210 forwards received datagrams associated with the multicast groups, via a socket 230 assigned to a network protocol stack functional unit 220 of an operating system 211 of a respective second automation device, to a filter unit 240 of the respective second automation device, as indicated in step 230. Here, the second automation devices each have at least one network adapter 210.

Next, the filter unit discards the forwarded datagrams or forwards the datagrams to the respective control application based on forwarding criteria respectively predefined by the control applications, as indicated in step 240. In accordance with the method, the datagrams are (i) forwarded directly to the control applications and/or (ii) discarded directly via the sockets, without processing by the operating system of the respective second automation device.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting data within an industrial automation system, comprising:

making available, by at least one first automation device within the industrial automation system, payload data comprising at least one of control, measurement and status data for reception by control applications executing in second automation devices;

sending, by the at least one first automation device, datagrams comprising the payload data or a selection of payload data to at least one multicast group, the second automation devices registering themselves selectively as subscribers at least in a multicast group;

forwarding, by at least one network adapter, received datagrams associated with the multicast groups, via a socket assigned to a network protocol stack functional unit of an operating system of a respective second automation device, to a filter unit of the respective second automation device, the second automation devices each having at least one network adapter;

discarding, by the filter unit, the forwarded datagrams or forward the datagrams to the respective control application based on forwarding criteria respectively predefined by the control applications, the datagrams being at least one of (i) forwarded directly to the control applications and (ii) discarded directly via the sockets, without processing by the operating system of the respective second automation device.

2. The method as claimed in claim 1, wherein the first automation device cyclically sends first information to advertise available payload data to a predefined first multicast address within the industrial automation system;

wherein the first information comprises details about the first automation device and at least one second multicast address via which selected payload data are made available; and wherein the second automation devices filter the first information based on respectively selected details and read the respective second multicast address from selected first information.

3. The method as claimed in claim 2, wherein the second automation devices register themselves as subscribers in the multicast group associated with the respectively read second multicast address; and wherein the second automation devices receive selected payload data sent to the respective second multicast address.

4. The method as claimed in claim 1, wherein the first automation device makes the payload data available for the second automation devices in accordance with Open Platform Communications Uniform Architecture (OPC UA) Publish-Subscribe (PubSub); wherein the first automation device serves as a publisher; and wherein the second automation devices serve as subscribers.

5. The method as claimed in claim 2, wherein the first automation device makes the payload data available for the second automation devices in accordance with Open Platform Communications Uniform Architecture (OPC UA) Publish-Subscribe (PubSub); wherein the first automation device serves as a publisher; and wherein the second automation devices serve as subscribers.

6. The method as claimed in claim 3, wherein the first automation device makes the payload data available for the second automation devices in accordance with Open Platform Communications Uniform Architecture (OPC UA) Publish-Subscribe (PubSub); wherein the first automation device serves as a publisher; and wherein the second automation devices serve as subscribers.

7. The method as claimed in claim 1, wherein the sockets are Express Data Path (XDP) sockets.

8. The method as claimed in claim 1, wherein a request to provide the sockets is made by the control applications via an application programming interface of the filter unit.

9. The method as claimed in claim 1, wherein the control applications are each provided via at least one sequence control component which is loadable into a sequence control environment installed on the respective second automation device and executed therein, and wherein the sequence control components execute in isolation from one another within the sequence control environment and share an operating system core of the respective second automation device.

10. The method as claimed in claim 9, wherein the sequence control components are one of containers, WebAssembly and Java bytecode; and wherein the sequence control environment is one of a container runtime environment, a WebAssembly runtime environment and a Java virtual machine.

11. The method as claimed in claim 1, wherein quality of service parameters characterizing quality of service requirements are specified by at least one of the first automation device and the second automation devices to forward multicast datagrams containing selected payload data from the first automation device to the second automation devices via network infrastructure devices; and wherein resources for transmitting the multicast datagrams in accordance with the specified quality of service parameters are reserved in each of the network infrastructure devices, provided sufficient availability exists, the availability being checked by a superordinate communication control unit of at least one of the automation system and the network infrastructure devices.

12. The method as claimed in claim 11, wherein the network infrastructure devices are switches or bridges; and wherein the resources for transmitting the multicast datagrams comprise at least one of usable transmission windows, bandwidth, maximum guaranteed latency, queue count, queue cache and address cache in switches or bridges.

13. The method as claimed in claim 11, wherein forwarding of the multicast datagrams via the network infrastructure devices is controlled via at least one of (i) frame preemption in accordance with Institute of Electrical and Electronics Engineers (IEEE) standard 802.1Q, (ii) time-aware shapers in accordance with IEEE standard 802.1Q, (iii) credit-based shapers in accordance with IEEE standard 802.1Q, (iv) burst-limiting shapers, (v) peristaltic shapers and (vi) priority-based shapers.

14. The method as claimed in claim 12, wherein forwarding of the multicast datagrams via the network infrastructure devices is controlled via at least one of (i) frame preemption in accordance with Institute of Electrical and Electronics Engineers (IEEE) standard 802.1Q, (ii) time-aware shapers in accordance with IEEE standard 802.1Q, (iii) credit-based shapers in accordance with IEEE standard 802.1Q, (iv) burst-limiting shapers, (v) peristaltic shapers and (vi) priority-based shapers.

15. A system for transmitting data, comprising:

at least one first automation device; and a plurality of second automation devices within an industrial automation system;

wherein the at least one first automation device is configured to make available payload data comprising at least one of control, measurement and status data within the industrial automation system for reception by control applications executing in second automation devices;

wherein the at least one first automation device is further configured to send datagrams comprising the payload data or a selection of payload data to at least one multicast group;

wherein the plurality of second automation devices are each configured to register themselves selectively as subscribers at least in a multicast group;

wherein the plurality of second automation devices each have at least one network adapter which is configured to forward received datagrams associated with the multicast groups, via a socket assigned to a network protocol stack functional unit of an operating system of the respective second automation device, to a filter unit of the respective second automation device;

wherein filter units are each configured to discard the forwarded datagrams or to forward said datagrams to a respective control application based on forwarding criteria respectively predefined by the control applications, the datagrams being at least one of forwarded directly to the control applications and discarded directly via the sockets, without processing by the operating system of the respective second automation device.

16. An automation device for the system as claimed in claim 15, wherein the automation device is configured to register itself selectively as a subscriber at least in the multicast group;

wherein the automation device includes at least one network adapter which is configured to forward received datagrams associated with multicast groups, via the socket assigned to the network protocol stack functional unit of the operating system of the automation device, to the filter unit of the automation device;

wherein the filter unit is configured to discard the forwarded datagrams or to said forward datagrams to the respective control application based on forwarding criteria respectively predefined by control applications, the datagrams being at least one of forwarded directly to the control applications and discarded directly via the sockets, without processing by the operating system of the automation device.

* * * * *